United States Patent [19]

Irissou

[11] 4,024,732
[45] May 24, 1977

[54] DEVICE FOR THE MECHANICAL FILTERING OF THE MOVEMENT TRANSMITTED BY A STEP MOTOR

[75] Inventor: Pierre-Regis Marie Irissou, Meudon, France

[73] Assignee: Advanced Technology Applications Corporation (ATAC), Meudon, France

[22] Filed: Nov. 6, 1975

[21] Appl. No.: 629,468

[30] Foreign Application Priority Data

Aug. 11, 1974 France ............................ 74.37169

[52] U.S. Cl. ............................ 64/27 CT; 64/15 C; 64/30 C; 188/1 B
[51] Int. Cl. ............................................. F16d 3/14
[58] Field of Search ............ 64/15 C, 27 C, 27 CT, 64/15 R, 27 R, 30 C; 188/1 V; 74/472

[56] References Cited

UNITED STATES PATENTS

| | | | |
|---|---|---|---|
| 1,655,332 | 1/1928 | Pedersen et al. | 64/15 C |
| 2,332,859 | 10/1943 | Kreissig et al. | 64/27 CT |
| 2,656,699 | 10/1953 | Chapin | 64/27 CT |
| 3,930,380 | 1/1956 | Fogt | 64/27 R |

Primary Examiner—Samuel Scott
Assistant Examiner—Randall Heald
Attorney, Agent, or Firm—Irvin A. Lavine

[57] ABSTRACT

For mechanically filtering movement transmitted by a step-by-step motor to a member to be driven in rotation, a coil spring in an axial bore of the motor shaft has one end rigid with the shaft and the other end rigid with the member to be driven and is axially pre-stressed to urge a damping member, rigid with the member to be driven, into frictional contact with the shaft.

4 Claims, 4 Drawing Figures

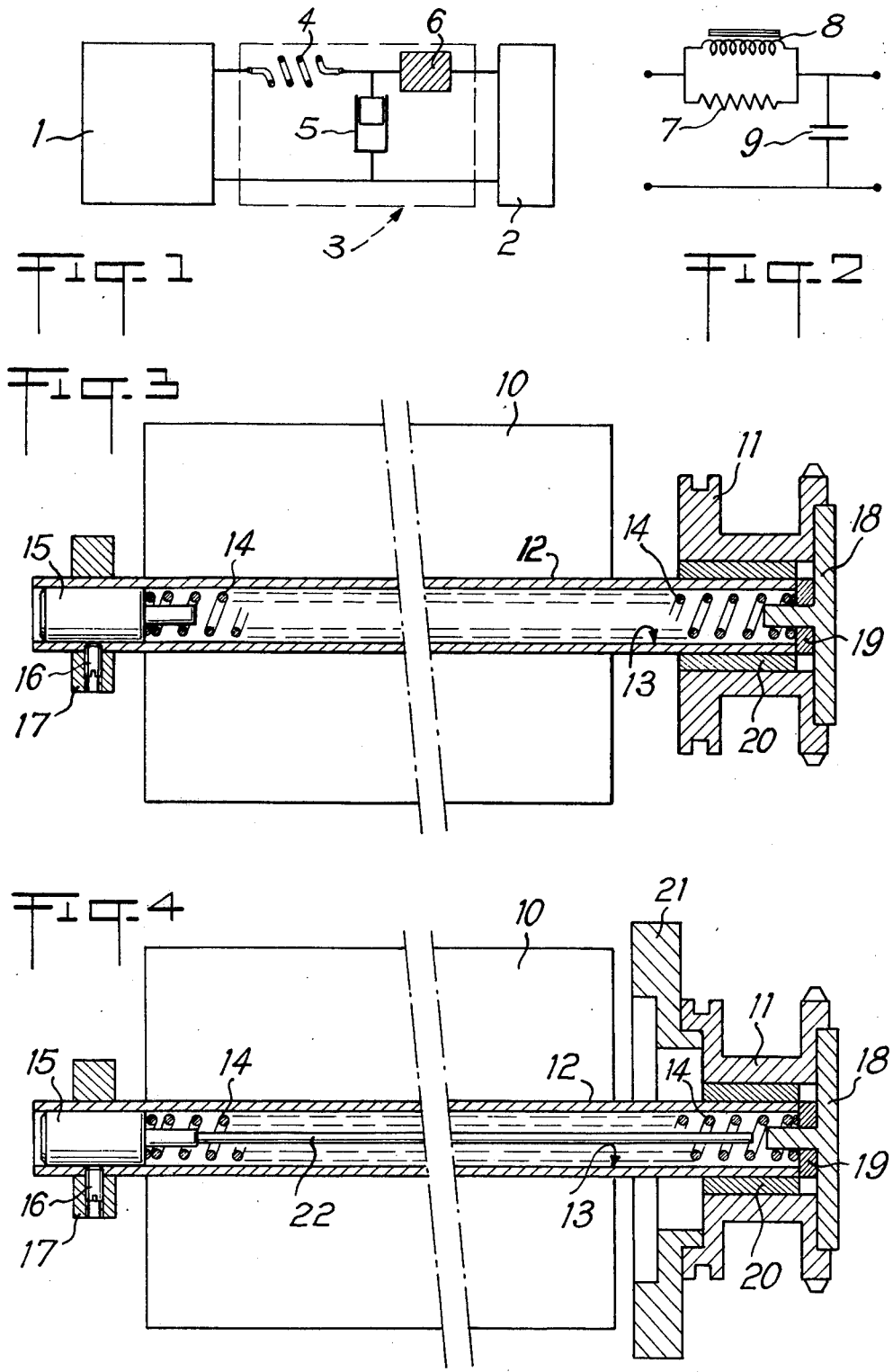

DEVICE FOR THE MECHANICAL FILTERING OF THE MOVEMENT TRANSMITTED BY A STEP MOTOR

This invention has for its object to provide a dive for the mechanical filtering movement transmitted by a step driving motor.

In numerous forms of apparatus, such as for example those for reading from or recording on audio or video information-bearing members, the necessity for regularity of movement, combined with the need for precision and speed in the displacement of the driven members, cannot be completely satisfied when these members have some inertia and are directly coupled to the shaft of a driving motor.

This is particularly so when the driving motor is a step motor which, if it is able to effect rapid and precise displacements while conserving its synchronism through an extended range of speed, can only transmit its movements to members of very small inertia because of the discontinuous nature of this movement. The driving of members with a greater inertia requires a mechanical filtering of the transmitted movement.

The present invention has for its object to provide a simple and reliable device for effecting such a mechanical filtering.

This object is achieved by a device which comprises a resilient torsion element arranged in an axial bore of the shaft and connecting the motor shaft to the member to be driven, and a damping member rigid with the said member to be driven and urged in frictional contact with the shaft, the said resilient torsion element being a coil spring arranged axially within the said bore, having one end rigid with the shaft and the other end rigid with the said member to be driven, and being axially pre-stressed in such a manner as to urge the said damping member into frictional contact with the shaft.

The use as a transmission element between the shaft of the step motor and the member to be driven of a simple spring acting, on the one hand, as a resilient coupling element capable of being subjected to a resilient torsion during a relative movement of rotation between the said member to be driven and the motor shaft, and on the other hand as an element resiliently urging the damping member against the shaft, permits the device according to the invention to have great simplicity of construction and assembly.

Other features and advantages of the invention will appear from a consideration of the following description of one embodiment, given as a non-limiting example, with reference to the figures of the accompanying drawings, which illustrate:

In FIG. 1, an equivalent diagram of a mechanical filtering device;

In FIG. 2, a diagram showing the electrical analogy of the diagram shown in FIG. 1;

In FIG. 3, a diagrammatic view in section of one form of mechanical filtering device embodying the invention, and In FIG. 4, a diagrammatic view in section of a second form of filtering device embodying the invention.

A mechanical filtering device such as that according to the invention can be represented by the equivalent diagram of FIG. 1, the movement being transmitted from the motor 1 to the member 2 through a mechanical filter 3 comprising a resilient return element represented by a spring 4, a viscous damper 5 and an inertial mass 6. The electrical analogy of the filter 3 is shown in FIG. 2 and comprises a low-pass filter including, in series with the input of this filter, a parallel circuit formed by a resistance 7 (corresponding to the resilient return element 4) and an inductance 8 (corresponding to the damper 5) and, in parallel with the output of this filter, a capacitor 9 (corresponding to the inertial mass 6).

FIG. 3 illustrates one form of device embodying the invention for filtering the movement transmitted by a step-by-step motor 10 to a member 11 such as a toothed sprocket serving to drive a film in a cinematographic projection apparatus. The shaft 12 of the motor 10 is formed with an axial bore 13 in which is arranged a tension coil spring 14. At one of its ends the spring 14 is fixed to a cylindrical member 15 fitted into the bore 13 and rigid with the shaft 12 through the intermediary of a screw 16 extending radially through a ring 17 threaded on the shaft 12. At its other end, the spring 14 is fixed to a plate 18 which is rigid with the member 11 and on which is fixed a bronze ring 19. The bronze ring 19 is urged in frictional contact with the end of the shaft 12 by the spring 14. The member 11 is mounted on the shaft 12 through the intermediary of a self-lubricating bearing 20 to avoid any friction or binding.

The elements of the mechanical filter shown in FIG. 3 are respectively the spring 14 acting as a resilient coupling working in torsion between the motor 10 and the member 11, the bronze ring 19 serving as a damping member through its friction with the shaft and the mass of the member 11 serving as an inertial mass. The spring 14 is selected to be sufficiently stiff to allow the member 11 to be rapidly brought up to speed upon starting and is axially pre-stressed in tension to obtain between the ring 19 and the shaft 12 an amount of friction corresponding to the desired damping.

In certain cases, for example for the driving of magnetic sound carriers in apparatus for sound reproduction or in apparatus for cinematographic projection involving sound, the filtering of the movement must be carried out to a greater extent. This can be effected by means of a device such as that shown in FIG. 4. The elements common to the devices illustrated in FIGS. 3 and 4 carry the same reference numerals and will not be described again. To obtain the more extended filtering, a flywheel 21 is fixed to the member 11 in order to increase the inertial mass and the spring 14 is selected to be of relatively small stiffness. Thus, to avoid too long a period for getting the member 11 up to speed upon starting and to avoid subjecting the spring 14 to deformations such as would exceed its elastic limit, an axial rod 33 rigid with the shaft 12 and of diameter less than the internal diameter of the coils of the spring 14 at rest, is arranged in the bore 13. Thus, the expansion or contraction of the coils of the spring 14 when this latter is subjected to torsional stresses is limited by the internal cylindrical surface of the bore 13 and the external cylindrical surface of the rod 22 and the spring 14 is given a non-linear characteristic by reason of the rubbing of its coils against the shaft 12 or the rod 22.

It will be noted that in the mechanical filtering device according to the invention, there is no positive coupling between the step motor shaft and the member to be driven, the movement being wholly transmitted by the resilient torsion element constituted by the spring. The device according to the invention is thus more particularly suitable for the driving of members which do not have a large inertia, such as toothed wheels for driving information carriers in the form of perforated strips, and it enables an optimal exploitation of the qualities of methods of driving by means of a step motor, in particular the speed, the accuracy and the flexibility of control. By way of example, the device according to the invention is particularly suitable for the variable speed feed for an image-carrying strip which is the subject of U.S. Pat. No. 3,849,715.

I claim:

1. A device for the mechanically filtering of the movement transmitted by a step motor to a member to be driven in rotation, comprising:

a resilient tension element in the form of a coil spring arranged axially in an axial bore of a driving shaft rotated by the motor, said spring having one end rigid with the shaft and the other end rigid with the member to be driven which is substantially coaxial with said shaft; and a damping member coaxial with and rigid with the member to be driven and having a radial surface engageable in frictional contact with a radial end surface of the shaft; the coil spring being axially pre-stressed to urge the said damping member into frictional contact with the shaft.

2. A device according to claim 1, wherein said damping member is a ring secured to a plate fixed to said member to be driven and connected to said other end of said spring through said ring, said ring being urged into frictional contact with said radial end surface of the shaft through said plate, and wherein said member to be driven is a wheel mounted on the end portion of said shaft adjacent said radial end surface thereof.

3. A device according to claim 1, further comprising an axial rod rigid with the shaft and arranged within the said bore, the external diameter of this rod being less than the internal diameter of the coils of the spring, the cylindrical surface of the bore and the external cylindrical surface of the rod constituting rubbing surfaces for the coils of the spring in such a manner as to limit the deformation of the spring when it is subjected to torsional stress tending to expand or contract its coils.

4. A device according to claim 1, comprising a flywheel rigid with the member to be driven.

* * * * *